(12) United States Patent
Campbell et al.

(10) Patent No.: US 9,363,512 B2
(45) Date of Patent: Jun. 7, 2016

(54) MOTION VECTOR SIGN BIT HIDING

(71) Applicant: Research In Motion Limited, Waterloo (CA)

(72) Inventors: Steven Wayne Campbell, Kitchener (CA); Dake He, Waterloo (CA); Xiang Yu, Kitchener (CA); Jing Wang, Waterloo (CA)

(73) Assignee: BlackBerry Limited, Waterloo (CA)

( * ) Notice: Subject to any disclaimer, the term of this patent is extended or adjusted under 35 U.S.C. 154(b) by 556 days.

(21) Appl. No.: 13/774,199

(22) Filed: Feb. 22, 2013

(65) Prior Publication Data

US 2013/0235936 A1 Sep. 12, 2013

Related U.S. Application Data

(60) Provisional application No. 61/608,248, filed on Mar. 8, 2012.

(51) Int. Cl.
| | |
|---|---|
| *H04N 7/12* | (2006.01) |
| *H04N 11/02* | (2006.01) |
| *H04N 19/51* | (2014.01) |
| *H04N 19/52* | (2014.01) |
| *H04N 19/513* | (2014.01) |
| *H04N 19/48* | (2014.01) |
| *H04N 19/467* | (2014.01) |

(52) U.S. Cl.
CPC ....... *H04N 19/00684* (2013.01); *H04N 19/467* (2014.11); *H04N 19/48* (2014.11); *H04N 19/513* (2014.11); *H04N 19/52* (2014.11)

(58) Field of Classification Search
None
See application file for complete search history.

(56) References Cited

U.S. PATENT DOCUMENTS

| | | | | |
|---|---|---|---|---|
| 2005/0013498 A1* | 1/2005 | Srinivasan et al. | ............ | 382/239 |
| 2010/0118960 A1* | 5/2010 | Nonogaki | ................ | 375/240.16 |
| 2011/0080954 A1* | 4/2011 | Bossen et al. | ............ | 375/240.16 |
| 2012/0114039 A1* | 5/2012 | Wang | ........................ | 375/240.13 |
| 2012/0189055 A1* | 7/2012 | Chien et al. | ............... | 375/240.14 |
| 2013/0039426 A1* | 2/2013 | Helle et al. | ............... | 375/240.16 |

OTHER PUBLICATIONS

W-J Chien et al: "Adaptive resolution on motion vector difference", 6. JCT-VC Meeting; 97. MPEG Meeting; Jul. 14, 2011-Jul. 22, 2011; Torino.
Clare (Orange Labs) G et al: "Sign Data Hiding", 98. MPEG Meeting; Nov. 28, 2011-Dec. 2, 2011; Geneva.
EP Office Action dated Aug. 26, 2013, EP 13157145.7.

(Continued)

*Primary Examiner* — Samuel D Fereja
(74) *Attorney, Agent, or Firm* — Rowand LLP

(57) ABSTRACT

Methods of encoding and decoding for video data for encoding or decoding motion vector difference components for inter-coded video are described. The sign of one of the components is hidden within the parity of the sum of the magnitudes of the horizontal and vertical difference components. The sign of the other of the components is explicitly signaled in the bitstream. The hidden sign may be assigned to the larger in magnitude of the two components. In other cases, the hidden sign may always be assigned to the horizontal or vertical component. In another case, the hidden sign may always be assigned to one component, unless that component is zero, in which case the hidden sign is assigned to the other component. In another case, both components may have their signs hidden, in which case the sign hiding is based on their respective parity, rather than the parity of their sum.

28 Claims, 8 Drawing Sheets

(56) References Cited

OTHER PUBLICATIONS

Extended European Search Report dated Apr. 26, 2013.
W-J. Chien et al., "Adaptive Resolution on Motion Vector Difference", 6. JCT-VC Meeting; Jul. 14, 2011.
Clare G et al., "Sign Data Hiding", 98. MPEG Meeting, Nov. 28, 2011.
Marpe, H. Schwarz, and T. Wiegand, "Context-based adaptive binary arithmetic coding in the h.264/AVC video compression standard," IEEE Transactions on Circuits and Systems for Video Technology, 13(7):620-636, Jul. 2003.
B. Bross, W-J Han, J-R Ohm, G. J. Sullivan, and T. Wiegand, "WD4: Working Draft 4 of High-Efficiency Video Coding," JCT-VC of ITU-T SG16 WP3 and ISO/IEC JTC1/SC29/WG11, 6th Meeting, Torino, Jul. 2011.
F. Bossen, "Common test conditions and software reference configurations", JCTVC-F900, JCT-VC of ITU-T SG16 WP3 and ISO/IEC JTC1/SC29/WG11, 6th Meeting, Torino, Jul. 2011.
T. Nguyen, T. Winken, D. Marpe et al., "Reduced-complexity entropy coding of transform coefficient levels using a combination of VLC and PIPE", JCTVC-D336, JCT-VC of ITU-T SG16 WP3 and ISO/IEC JTC1/SC29/WG11, 4th Meeting, Daegu, Jan. 2011.
G. Clare, F. Henry, and J. Jung, "Sign Data Hiding", JCTVC-G271.
J. Sole, R. Joshi, M. Marczewicz, "Non-CE11: Diagonal sub-block scan for HE residual coding", JCTVC-G323.
N. Nguyen, T. Ji, D. He, G. Martin-Cocher, L. Song, "Multi-level significance maps for large transform units", JCTVC-G644.
Benjamin Bross, et al. "WD5: Working Draft 5 of High-Efficiency Video Coding" JCTVC-G1103_d4.
EPO, Extended European Search Report relating to application No. 12151973.0 dated Jul. 9, 2012.
Clare (Orange Labs) G et al., "Sign Data Hiding", 7, JCT-VC Meeting; 98; MPEG Meeting; Nov. 21, 2011-Nov. 30, 2011; Geneva; (Joint Collaborative Team on Video Coding of ISO/IEC JTC1/SC29/WG11 and ITU-T SG. 16); URL: http://wftp3.itu.int/av-arch/jctvc-site/,, No. JCTVC-G271, Nov. 8, 2011, XP030110255.
Amonou (FT) I et al., "Description of Video Coding Technology Proposal by France Telecom, NTT, NTT DOCOMO, Panasonic and Technicolor", 1. JCT-VC Meeting; Apr. 15, 2010-Apr. 23, 2010; Dresden; (Joint Collaborative Team on Video Coding of ISO/IEC JTC1/SC29/WG11 and ITU-T SG.16); URL: http://wftp3; ITU.INT/AV-ARCH/JCTVC-SITE/,, No. JCTVC-A114, Apr. 13, 2010, XP030009031.
J-M Thiesse et al: "Data Hiding of Intra Prediction Information in Chroma Samples for Video Compression", 2010 17th IEEE International Conference on Image Processing: (ICIP 2010); Hong Kong, Sep. 26-29, 2010, IEEE, Piscataway, NJ, USA, Sep. 26, 2010, XP031813491.
B. Bross, W-J Han, J-R Ohm, G. J. Sullivan, and T. Wiegand, "High efficiency video coding (HEVC) text specification draft 6," JCT-VC of ITU-T SG16 WP3 and ISO/IEC JTC1/SC29/WG11, 8th Meeting, San Jose, JCTVC-H1003.
CIPO, CA Office Action relating to Application No. 2,807,786, dated Jan. 21, 2015.
Chien et al.: "Adaptive Resolution on Motion Vector Difference" JCTV-F567, Jul. 12, 2011, XP030009590.
Clare et al.: "Sign Data Hiding" JCTVC-G271, Nov. 24, 2011, XP030050396.

\* cited by examiner

MOTION VECTOR SIGN BIT HIDING

CROSS-REFERENCE TO RELATED APPLICATIONS

The present application claims priority to U.S. provisional patent application Ser. No. 61/608,248, filed Mar. 8, 2012, the contents of which are hereby incorporated by reference.

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present application generally relates to data compression and, in particular, to methods and devices for motion vector sign bit hiding when encoding and decoding residual video data.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU termed High Efficiency Video Coding (HEVC/H.265). The initiative may eventually result in a video-coding standard that will form part of a suite of standards identified as MPEG-H.

There are a number of standards for encoding/decoding images and videos, including H.264, that use block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that HEVC/H.265 will also have these features.

Motion prediction involves search for and selecting a prediction block from a previously decoded reference picture or frame. This prediction block is specified to the decoder by way of a motion vector. Rather than explicitly encoding the motion vector, most motion vectors are specified as motion vector differences relative to a predicted motion vector. In many implementations, the motion vector difference is encoded as two elements: a horizontal offset and a vertical offset. Each element may be preceded by a non-zero flag. If the non-zero flag indicates the offset is zero, no further data regarding that element need be encoded. If non-zero, then the magnitude of the element/offset is encoded followed by a sign bit indicating whether the offset is positive or negative.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
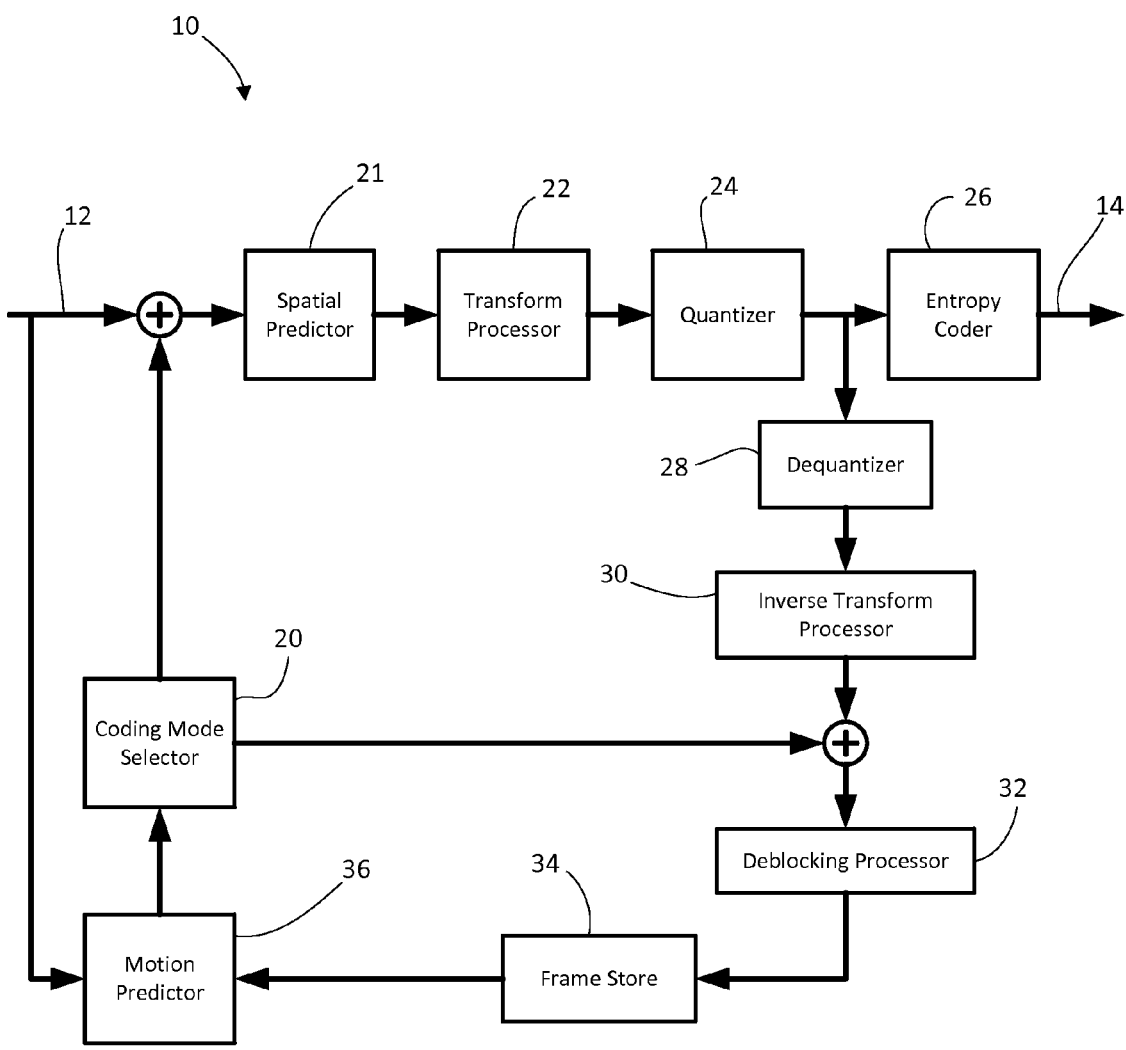
FIG. 1 shows, in block diagram form, an encoder for encoding video.

The present application describes methods and encoders/decoders for encoding and decoding residual video data using motion vector sign bit hiding.

In one aspect, the present application describes a method of decoding a bitstream of inter-coded video in which a prediction block in a reference frame is specified by a motion vector, the bitstream encoding a horizontal motion vector difference component and a vertical motion vector difference component, wherein the motion vector is determined in the decoder based on a predicted motion vector adjusted by the horizontal motion vector difference component and the vertical motion vector difference component. The method includes decoding a part of the bitstream to reconstruct a magnitude of one of the motion vector difference components; and assigning a sign to said magnitude of the one of the motion vector difference components based on whether said magnitude is even or odd.

In another aspect, the present application describes a method of encoding motion vectors difference components in a bitstream using parity-based sign bit hiding. The method may include limiting the motion vector search space in a sub-pixel search to locations that satisfy a parity condition for hiding the sign bit of one of the components of the motion vector difference.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264 standard for video coding and/or the developing HEVC/H.265 standard. Those ordinarily skilled in the art will understand that the present application is not limited to H.264/AVC or HEVC/H.265 but may be applicable to other video coding/decoding standards, including possible future standards, multi-view coding standards, scalable video coding standards, and reconfigurable video coding standards.

In the description that follows, when referring to video or images the terms frame, picture, slice, tile and rectangular slice group may be used somewhat interchangeably. Those of skill in the art will appreciate that, in the case of the H.264 standard, a frame may contain one or more slices. It will also be appreciated that certain encoding/decoding operations are performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to transform units, coding units, groups of coding units, etc., as will become apparent in light of the description below.

Figure 2:
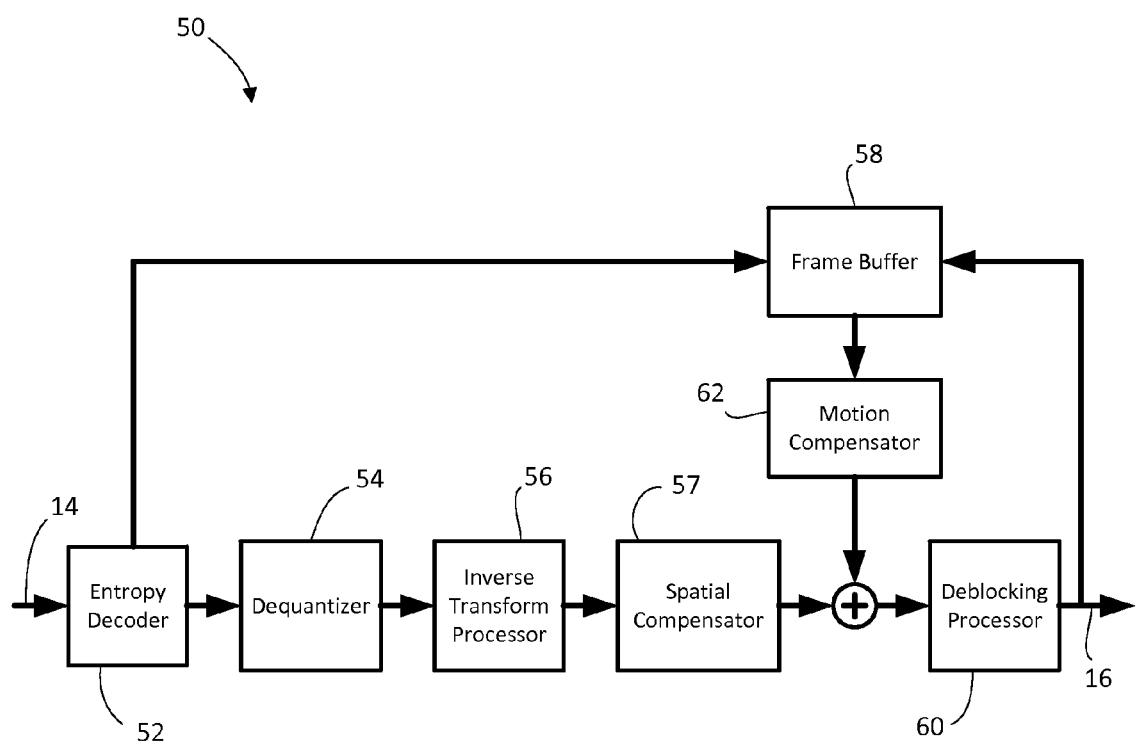
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, like HEVC/H.265.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks, coding units, etc.) within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform or others may be used in some instances. The block-based transform is performed on a coding unit, macroblock or sub-block basis, depending on the size of the macroblocks or coding units. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered as a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

The block or matrix of quantized transform domain coefficients may be referred to herein as a "transform unit" (TU). In some cases, the TU may be non-square, e.g. a non-square quadrature transform (NSQT).

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. The deblocking processor 32 may include a deblocking processor and a filtering processor. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks or coding units to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing video encoders.

The decoder 50 includes an entropy decoder 52, dequantizer 54, inverse transform processor 56, spatial compensator 57, and deblocking processor 60. The deblocking processor 60 may include deblocking and filtering processors. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock or coding unit, the recreated "video data" is the residual data for use in spatial compensation relative to a previously decoded block within the frame. The spatial compensator 57 generates the video data from the residual data and pixel data from a previously decoded block. In other cases, such as inter-coded macroblocks or coding units, the recreated "video data" from the inverse transform processor 56 is the residual data for use in motion compensation relative to a reference block from a different frame. Both spatial and motion compensation may be referred to herein as "prediction operations".

The motion compensator 62 locates a reference block within the frame buffer 58 specified for a particular inter-coded macroblock or coding unit. It does so based on the reference frame information and motion vector specified for the inter-coded macroblock or coding unit. It then supplies the reference block pixel data for combination with the residual data to arrive at the reconstructed video data for that coding unit/macroblock.

A deblocking/filtering process may then be applied to a reconstructed frame/slice, as indicated by the deblocking processor 60. After deblocking/filtering, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

It is expected that HEVC/H.265-compliant encoders and decoders will have many of these same or similar features.

To improve compression efficiency, most motion vectors are specified in the bitstream as a differential from a predicted motion vector, e.g. a previous motion vector. That is, a motion vector may be specified by the relative change from the predicted motion vector. In at least some embodiments, this is done by specifying the motion vector difference in the x-direction (horizontal) and the difference in the y-direction (vertical).

In one example implementation the differential may be specified by first encoding a non-zero flag. If the non-zero flag indicates that the difference is non-zero, then the motion vector difference component is encoded, followed by a sign bit to indicate whether the difference is positive or negative. If the flag indicates that the difference is zero, then nothing further need be encoded with respect to that motion vector difference component.

In another example implementation the differential may be specified by first encoding a non-zero flag and then, if non-zero, encoding a greater-than-one flag. If the greater-than-one flag indicates that the motion vector difference component magnitude is greater than one, then the magnitude-minus-two is encoded. If the non-zero flag is set, then the greater-than-one flag and the magnitude-minus-two (if present) are followed by a sign bit.

At the encoder the motion vector search may be performed at full pixel, ½ pixel, ¼ pixel, or even ⅛ pixel resolution in some implementations.

Sign Bit Hiding

In accordance with one aspect of the present application, the sign bit of one or more motion vectors is not encoded in the bitstream and is inferred by the decoder based on a parity calculation. In one case, the parity calculation reflects whether the corresponding motion vector difference component is positive or negative.

To hide the sign bit of a motion vector component one option is to adjust the magnitude of the component to ensure the parity matches the sign. In other words, the search range of magnitudes for the motion vector are reduced from { . . . −4, −3, −2, −1, 0, 1, 2, 3, 4, . . . } to { . . . −3, −1, 0, 2, 4, . . . }. It will be understood that although the foregoing example uses integers, the actual motion vectors may be fractional. In practical implementations, in fact, the motion vectors, whether fractional or not, are specified in binary format. Accordingly, the last bit of the motion vector indicates its parity, i.e. even or odd, even where that last bit indicates a fraction, such as ¼ versus ²⁄₄.

This example sign bit hiding may be realized at the encoder by reducing the number of candidate motion vectors to those that have horizontal and vertical components that meet these restrictions. If implemented for both the horizontal and vertical components, the search space is reduced, thus reducing encoder complexity but sacrificing some sub-pixel resolution, and a bit is saved for each component.

In another example embodiment, the sign bit hiding for one of the motion vector components (either the horizontal motion vector difference component or the vertical motion vector difference component) is based on the sum of the absolute-value of the two components, i.e. the sum of their magnitudes. That is, the sum of the two components produces a parity (e.g. a parity bit) and that parity indicates the sign of one of the components. The sign of the other component is explicitly coded in the bitstream (provided that component is non-zero).

It will be appreciated that the parity in this example implementation may involve summing the least significant bit of the horizontal motion vector difference component and the least significant bit of the vertical motion vector difference component. If the sum is zero (e.g. 0 or binary '10') then the parity is even. If the sum is 1, then the parity is odd. It will be appreciated that the parity calculation test may be implemented as an XOR operation.

By hiding the sign of one component in the parity of the sum of the magnitudes of the two components, the encoder has the freedom to choose to adjust either of the components in order to ensure the parity is correct for encoding the sign. In practice, the encoder may simply restrict its motion vector search to locations that result in the correct parity.

Figure 3:
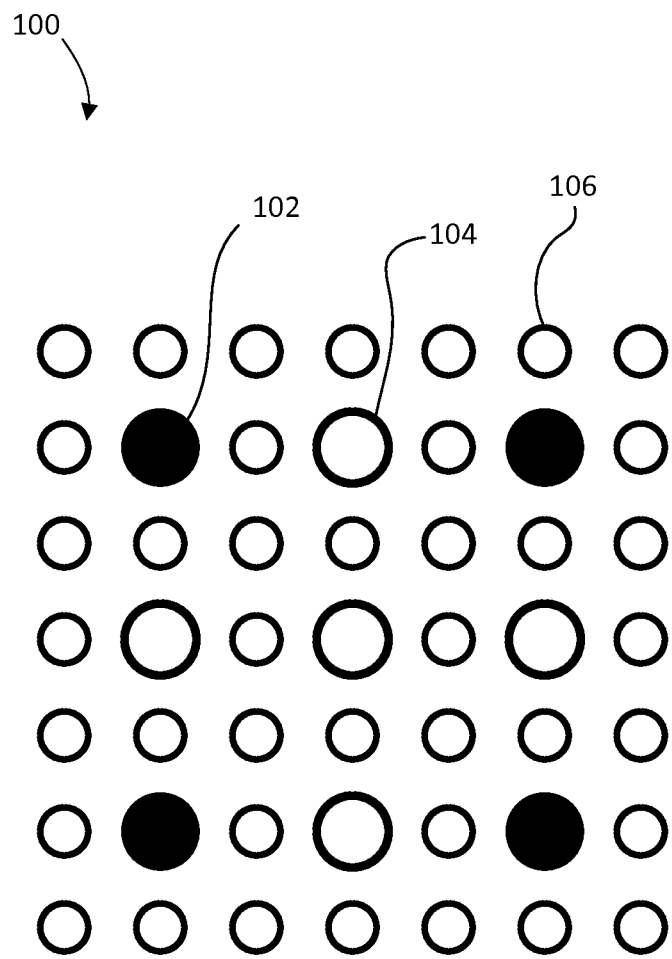
FIG. 3 shows an example of a partial search space for motion vectors using a quarter-pixel resolution.

Reference is made to FIG. 3, which illustrates an example of a partial motion vector search space 100 at quarter-pixel resolution. The large dark circles 102 indicate pixel locations (i.e. whole-pixel locations), whereas the large white circles 104 indicate half-pixel locations and the small white circles 106 indicate quarter-pixel locations.

When conducting a motion vector search, the encoder may limit its search space to a motion vector that satisfies the parity condition for sign hiding. Suppose, for example, that the sign of one of the components is positive and is to be hidden in the parity of the sum of the magnitudes of the two components, and a positive sign is to be hidden using even parity. The encoder would only consider motion vector candidates in its search that result in a sum having even parity. That is, if the horizontal motion vector difference component and vertical motion vector difference component of a location result in an odd parity, then that position is not considered in the motion vector search.

Figure 4:
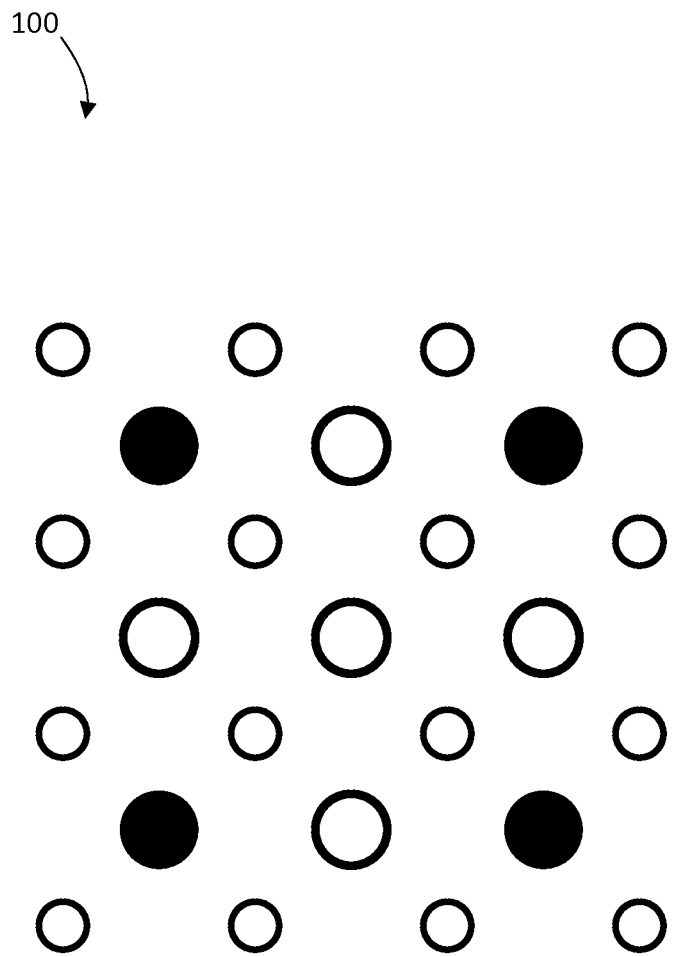
FIG. 4 shows the example search space excluding quarter pixels that do not satisfy a parity condition for encoding a sign bit within the parity.

FIG. 4 illustrates the partial motion vector search space 100 with the quarter pixel-locations removed that would (in this example) result in an odd parity. Accordingly, all the candidate locations remaining, including the whole-pixel and half-pixel locations, result in an even parity from the sum of the magnitudes of the horizontal and vertical motion vector difference components. It will be appreciated that this example may be dependent on the prediction from which the motion vector difference is calculated, so in some instances the pattern shown in FIG. 4 may result in an odd parity.

Figure 5:
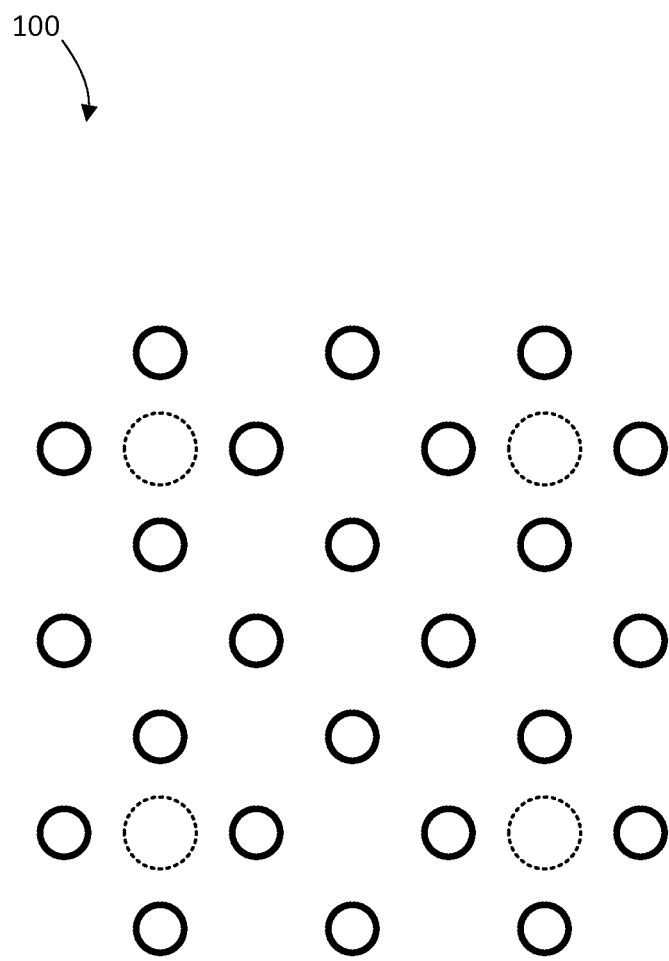
FIG. 5 shows the same example search space excluding locations that do not satisfy the parity condition for encoding the opposite sign bit within the parity.

FIG. 5 illustrates the partial motion vector search space for the same example adjusted to remove the locations that would result in an even parity. The whole-pixel locations are shown in phantom lines to aid in understanding the illustration but are not valid candidates in the search space. Accordingly, for this example, all the remaining locations produced the desired parity for sign bit hiding.

In one example embodiment, the sign bit of the horizontal motion vector difference component is hidden for each motion vector. In another example, the sign bit of the vertical motion vector difference component is hidden for each motion vector. In yet another example, the sign bit of the difference component that has the greatest magnitude is hidden. In the case where the magnitudes are the same, the encoder and decoder are configured to hide the sign bit for a predetermined one of the components. In a variation, the sign bit is hidden for the difference component that results in the largest magnitude component of the actual motion vector (the predicted components plus their respective difference values). In yet a further example, the sign bit of one of the components (vertical or horizontal) is always hidden unless the component is zero, in which case the sign bit of the other component is hidden.

In some implementations, sign bit hiding may be conditional on the motion vector having certain characteristics. That is, both the encoder and decoder evaluate whether the motion vector has the required characteristic before determining whether a sign bit is hidden for one of the components. In one example, the characteristic is the absolute magnitude of the previous or 'reference' motion vector; that is, the motion vector that the motion vector difference components are designed to adjust. The magnitude of the predicted motion vector is indicative of the degree of motion in that portion of the frame of video. A frame or picture with significant motion may be less sensitive to resolution of the motion vectors, whereas a relatively static frame or picture may be more sensitive to fine texture differences. The frame or picture header may specify a threshold value. For each set of motion vector difference components, if the magnitude of the predicted motion vector exceeds the threshold then sign bit hiding is used to encode one of the signs of the current motion vector difference components; otherwise, both signs of the motion vector difference components are signaled in the bitstream. In a variation, the condition uses an average (perhaps weighted) of two or more previous motion vectors and determines if their average magnitude exceeds the threshold.

In another implementation, the sign bit hiding may be conditional on the magnitude of the motion vector difference components themselves. That is, if the summed magnitude of the motion vector difference components exceeds a threshold, then sign bit hiding is used for one of the motion vector difference components. In another variation, the condition is that at least one of the motion vector difference components has a magnitude that exceeds a threshold.

In yet another implementation, sign bit hiding may be turned on or turned off on a frame or picture basis. A bit in the frame or picture header may indicate whether sign bit hiding is used for motion vectors within the frame or picture. The decision at the encoder to use sign bit hiding or not may be based upon the characteristics of the picture, such as the degree of motion in the picture overall. This may be based upon a running (perhaps weighted) average of motion vector magnitude in one or more preceding pictures or frames. Other factors may also be used to determine whether to use sign bit hiding.

Figure 6:
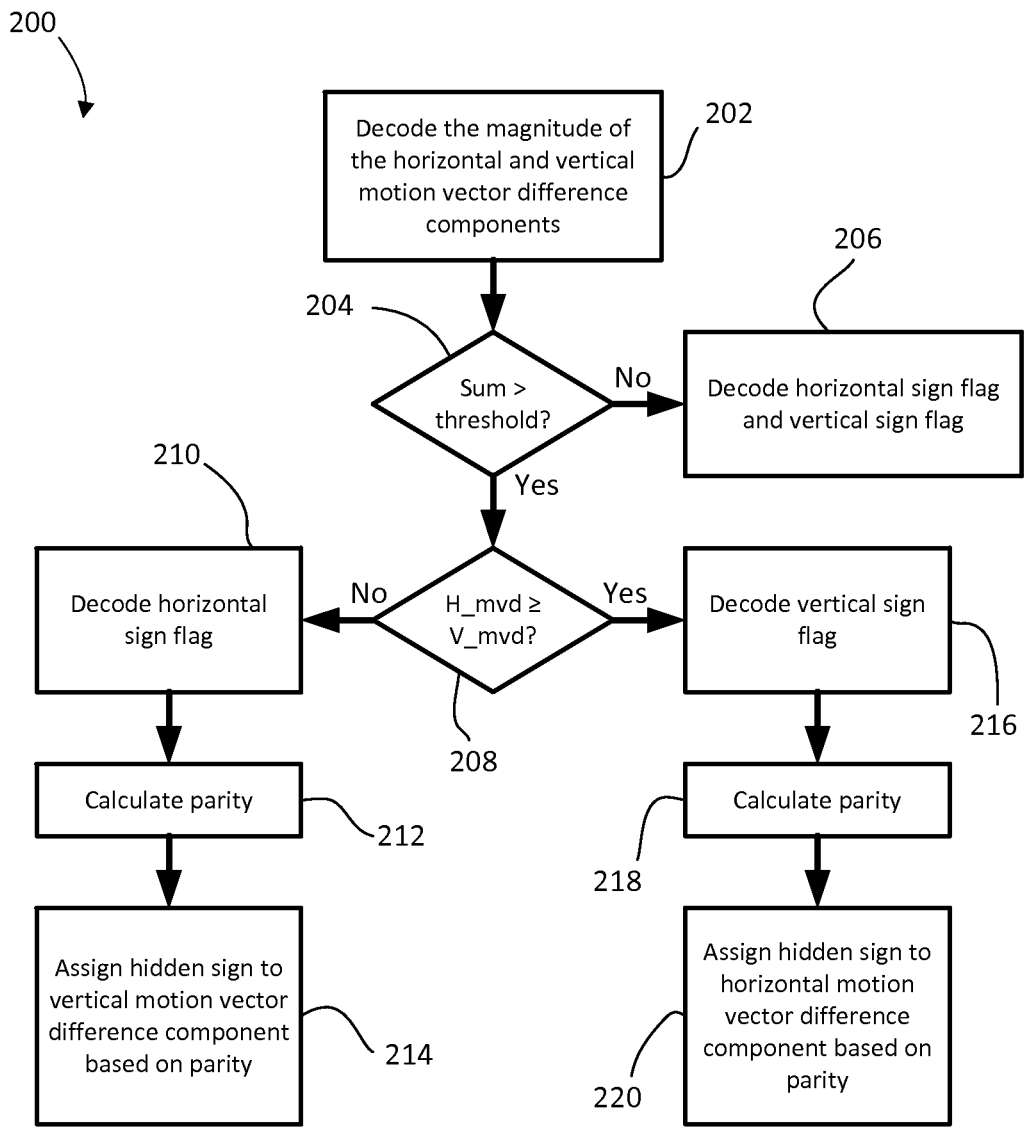
FIG. 6 shows, in flowchart form, an example method of decoding a motion vector with sign bit hiding.

Reference is now made to FIG. 6, which shows an example method 200 of decoding motion vectors with sign bit hiding. The method 200 in this example is based upon sign bit hiding that is enabled when the sum of the magnitudes of the motion vector difference components exceeds a threshold, and in which the sign bit of the largest of the motion vector difference component is hidden in the parity of their summation.

The method 200 begins with operation 202 in which the magnitude of the horizontal motion vector difference component and the magnitude of the vertical motion vector difference component are decoded from the bitstream. This operation 202 may include decoding a non-zero flag of each of the components. If the non-zero flag of one of the components indicates that the component is zero, then no further decoding of that motion vector difference component occurs and no sign bit is required for that component. If both motion vector difference components are zero, then the method 200 ends at operation 202 since no further decoding is required and no sign bits are hidden.

In operation 204, the decoder determines whether the sum of the magnitudes of the motion vector difference components is larger than a threshold value. As noted previously, the threshold value may be specified in a picture, frame or slice header, or may be otherwise communicated from the encoder to the decoder. The threshold value may be a default predetermined value in the absence of an explicit value communicated in one of the headers.

In this example, the threshold test is based upon the sum of the magnitudes of the motion vector difference components. As noted above, a number of other conditional tests may be applied in other embodiments to determine whether to hide a sign bit in any given case. In some embodiments, no conditional test is applied and sign bit hiding is either enabled for all motion vectors in the picture or not.

If the sum of magnitudes of the motion vector difference components does not exceed the threshold, then sign bit hiding is not used and in operation 206 the sign bits for the horizontal and vertical motion vector difference components are decoded from the bitstream.

If the sum does exceed the threshold, then the sign of one of the components is hidden and in operation 208 the decoder determines which of the motion vector difference components has the greater magnitude. This may be implemented as a greater-than-or-equal-to operation in some cases, to address the situation in which the magnitudes are the same. In this example, the condition is expressed as H_mvd≥V_mvd.

If the horizontal motion vector difference component is greater than or equal to the vertical motion vector difference component, then in operation 216 the sign bit for the vertical component is decoded from the bitstream. Conversely, if the horizontal motion vector difference component is less than the vertical motion vector difference component, then in operation 210 the sign bit for the horizontal component is decoded from the bitstream. Operations 210 and 216 may be implemented by simply decoding a sign bit and assigning the sign bit to either the horizontal or vertical component dependent upon the condition expressed in operation 208.

In operations 212 and 218 the parity is calculated. In this example, the parity is based on the sum of the magnitudes of the motion vector difference components. If the sum is even, the hidden sign bit is positive. If the sum is odd, the hidden sign bit is negative.

In operations 214 and 220, the hidden sign indicated by the parity is assigned to the vertical or horizontal motion vector difference component, respectively.

In one embodiment, the encoder may select a motion vector using ⅛ pixel resolution, at least in one direction. The motion vector may then be encoded using sign bit hiding (for both components if ⅛$^{th}$ resolution is used in both dimensions, or one component if only used in one dimension). The resulting motion vector resolution, even with sign bit hiding is ¼ pixel, although ⅛$^{th}$ pixel signaling requires 1 extra bit. Accordingly, in this embodiment the sign bit is replaced with an extra resolution bit. The switch from a sign bit to an extra bit of resolution that disguises a sign bit may nonetheless result in efficiencies in encoding. A flag in the picture or frame or slice header may indicate whether ⅛$^{th}$ pixel motion vector resolution is enabled.

An example syntax for implementing one embodiment of motion vector sign bit hiding is provided below. This example syntax is but one possible implementation. In this example, the sign of the horizontal motion vector difference component is always hidden. In the example syntax, the motion vector difference magnitude encoded as abs_mvd_minus2[ ] is initialized to −1 if its corresponding greater-than-one flag (abs_mvd_greater1[ ]) is set to 0. Example syntax is set out below:

| mvd_coding( mvd_x, mvd_y ) { | Descriptor |
|---|---|
|   abs_mvd_greater0_flag[ 0 ] | ae(v) |
|   if(abs_mvd_greater0_flag[ 0 ] ){ | |
|     abs_mvd_greater1_flag[ 0 ] | ae(v) |
|     if(abs_mvd_greater1_flag[ 1 ] ) | |
|       abs_mvd_minus2[ 0 ] | ae(v) |
|   } | |
|   abs_mvd_greater0_flag[ 1 ] | ae(v) |
|   if(abs_mvd_greater0_flag[ 1 ] ) { | |
|     abs_mvd_greater1_flag[ 1 ] | ae(v) |
|     if(abs_mvd_greater1_flag[ 1 ] ) | |
|       abs_mvd_minus2[ 1 ] | ae(v) |
|   mvd_sign_flag | ae(v) |
|   } | |
|   abs_mvd_x = abs_mvd_greater0_flag[ 0 ] * ( abs_mvd_minus2[0] + 2 ) | |
|   abs_mvd_y = abs_mvd_greater0_flag[ 1 ] * ( abs_mvd_minus2[1] + 2 ) | |
|   mvd_x = abs_mvd_x * ( 1 − 2 * ( abs_mvd_x + abs_mvd_y ) % 2 ) ) | |
|   mvd_y = abs_mvd_y * ( 1 − 2 * mvd_sign_flag ) | |
| } | |

It will be noted that in this example syntax, the decoder first decodes the horizontal motion vector greater-than-zero flag (abs_mvd_greater0_flag) and, if that flag is 1, then decodes the horizontal motion vector greater-than-one flag. If the greater-than-one flag is set then it decodes the magnitude of the horizontal motion vector difference component minus two (abs_mvd_minus2). The decoder uses the same process to decode the elements of the vertical motion vector difference component. A sign bit (mvd_sign_flag) is then decoded from the bitstream.

The decoder then determines the magnitude of the horizontal motion vector difference component as the horizontal motion vector greater-than-zero flag times the minus2 element plus two (as noted above, the minus 2 element is set to −1 in the case where the greater-than-one flag is zero so as to properly realize a motion vector difference component of 1). The decoder determines the magnitude of the vertical motion vector difference component in the same manner.

The decoder then assigns the sign bit to the vertical motion vector difference component by multiplying the magnitude by (1−2*mvd_sign_flag). The horizontal motion vector difference component is assigned a sign based on the parity of the sum of the magnitudes of the motion vector difference components, which is expressed as:

$$mvd\_x = abs\_mvd\_x * (1-2*(abs\_mvd\_x + abs\_mvd\_y) \%2))$$

Another example syntax is shown below. In this example, a similar decoding process is used; however, the hidden sign is applied to the horizontal motion vector difference component if the magnitude of the horizontal motion vector difference component is less than the magnitude of the vertical motion vector difference component. Otherwise, the hidden sign is applied to the vertical motion vector difference component.

| mvd_coding( mvd_x, mvd_y ) { | Descriptor |
|---|---|
|   abs_mvd_greater0_flag[ 0 ] | ae(v) |
|   if(abs_mvd_greater0_flag[ 0 ] ) { | |
|     abs_mvd_greater1_flag[ 0 ] | ae(v) |
|     if(abs_mvd_greater1_flag[ 0 ] ) | |
|       abs_mvd_minus2[ 0 ] | ae(v) |
|   } | |
|   abs_mvd_greater0_flag[ 1 ] | ae(v) |
|   if(abs_mvd_greater0_flag[ 1 ] ) { | |
|     abs_mvd_greater1_flag[ 1 ] | ae(v) |
|     if(abs_mvd_greater1_flag[ 1 ] ) | |
|       abs_mvd_minus2[ 1 ] | ae(v) |
|   } | |
|   if( abs_mvd_greater0_flag[ 0 ] && abs_mvd_greater0_flag[ 1 ] ) { | |
|     mvd_sign_flag | ae(v) |

-continued

| mvd_coding( mvd_x, mvd_y ) { | Descriptor |
|---|---|
| ``` 
    }
    abs_mvd_x = abs_mvd_greater0_flag[ 0 ] * (
    abs_mvd_minus2[0] + 2 )
    abs_mvd_y = abs_mvd_greater0_flag[ 1 ] * (
    abs_mvd_minus2[1] + 2 )
    if( abs_mvd_x < abs_mvd_y ) {
        mvd_x = abs_mvd_x * ( 1 - 2 * ( abs_mvd_x +
        abs_mvd_y ) % 2 ) )
        mvd_y = abs_mvd_y * ( 1 - 2 * mvd_sign_flag )
    } else {
        mvd_x = abs_mvd_x * ( 1 - 2 * mvd_sign_flag )
        mvd_y = abs_mvd_y * ( 1 - 2 * ( abs_mvd_x +
        abs_mvd_y ) % 2 ) )
    }
}
``` | |

Figure 7:
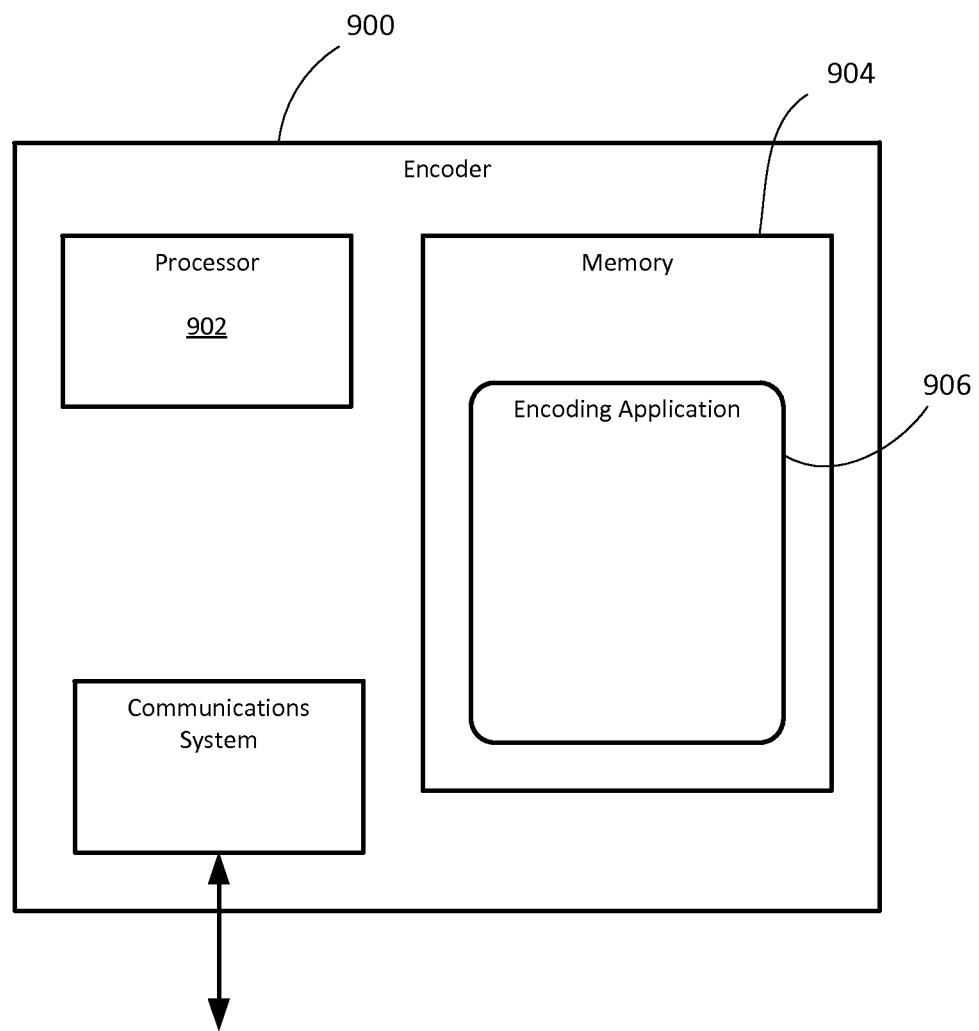
FIG. 7 shows a simplified block diagram of an example embodiment of an encoder.

Reference is now made to FIG. 7, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the processes described herein. It will be understood that the encoding application 906 may be stored in on a computer readable medium, such as a compact disc, flash memory device, random access memory, hard drive, etc.

Figure 8:
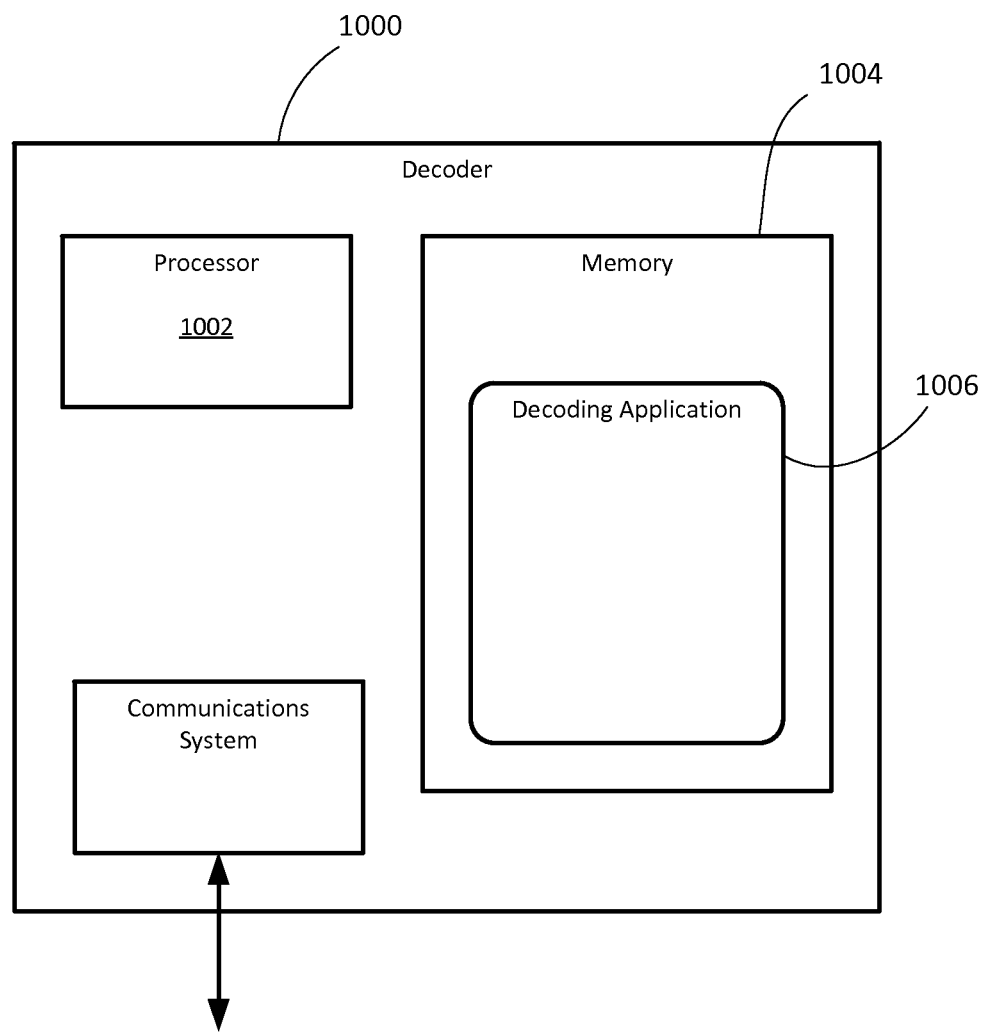
FIG. 8 shows a simplified block diagram of an example embodiment of a decoder.

Reference is now also made to FIG. 8, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. The decoding application 1006 may include an entropy decoder configured to reconstruct residuals based, at least in part, on reconstructing significant-coefficient flags, as described herein. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding a bitstream of inter-coded video using sign bit hiding, wherein a prediction block in a reference frame is specified by a motion vector, the bitstream encoding a horizontal motion vector difference component and a vertical motion vector difference component, wherein the motion vector is determined, in the decoder, based on a predicted motion vector adjusted by the horizontal motion vector difference component and the vertical motion vector difference component, the method comprising:
   decoding a part of the bitstream to reconstruct a magnitude of one of the motion vector difference components and to reconstruct a magnitude of the other of the motion vector difference components;
   determining a parity by summing said magnitude of the one of the motion vector difference components and said magnitude of the other of the motion vector difference components to obtain said parity;
   inferring a sign for said one of the motion vector difference components based on whether said parity is even or odd; and
   assigning the sign to said magnitude to reconstruct said one of the motion vector difference components.

2. The method claimed in claim 1, wherein assigning said sign comprises assigning said sign to the horizontal motion vector difference component unless the horizontal motion vector difference component is zero, in which case assigning comprises assigning said sign to the vertical motion vector difference component.

3. The method claimed in claim 1, wherein assigning said sign comprises assigning said sign to the vertical motion vector difference component unless the vertical motion vector difference component is zero, in which case assigning comprises assigning said sign to the horizontal motion vector difference component.

4. The method claimed in claim 1, wherein assigning includes determining which of the horizontal motion vector difference component and the vertical motion vector difference component has greater magnitude and assigning said sign to the motion vector difference component having the greater magnitude.

5. The method claimed in claim 1, further comprising determining that a picture header in the bitstream contains a motion vector sign bit hiding flag indicative that motion vector sign bits within a corresponding picture are hidden.

6. The method claimed in claim 1, further comprising, before assigning, confirming that a magnitude-based threshold test is met.

7. The method claimed in claim 6, wherein confirming comprises determining that the sum of the magnitudes of the motion vector difference components exceeds a threshold value.

8. A decoder for decoding a bitstream of inter-coded video using sign bit hiding, wherein a prediction block in a reference frame is specified by a motion vector, the bitstream encoding a horizontal motion vector difference component and a vertical motion vector difference component, wherein the motion vector is determined, in the decoder, based on a predicted motion vector adjusted by the horizontal motion vector difference component and the vertical motion vector difference component, the decoder comprising:
- a processor;
- a memory; and
- a decoding application stored in the memory and containing instructions that, when executed, cause the processor to:
  - decode a part of the bitstream to reconstruct a magnitude of one of the motion vector difference components and to reconstruct a magnitude of the other of the motion vector difference components,
  - determine a parity by summing said magnitude of the one of the motion vector difference components and said magnitude of the other of the motion vector difference components to obtain said parity,
  - infer a sign for said one of the motion vector difference components based on whether said parity is even or odd, and
  - assigning the sign to said magnitude to reconstruct said one of the motion vector difference components.

9. The decoder claimed in claim 8, wherein the processor is configured to assign said sign by assigning said sign to the horizontal motion vector difference component unless the horizontal motion vector difference component is zero, in which case the processor assigns said sign to the vertical motion vector difference component.

10. The decoder claimed in claim 8, wherein the processor is configured to assign said sign by assigning said sign to the vertical motion vector difference component unless the vertical motion vector difference component is zero, in which case the processor assigns said sign to the horizontal motion vector difference component.

11. The decoder claimed in claim 8, wherein the processor is configured to assign by determining which of the horizontal motion vector difference component and the vertical motion vector difference component has greater magnitude and assigning said sign to the motion vector difference component having the greater magnitude.

12. The decoder claimed in claim 8, wherein the processor is further configured to determine that a picture header in the bitstream contains a motion vector sign bit hiding flag indicative that motion vector sign bits within a corresponding picture are hidden.

13. The decoder claimed in claim 8, wherein the processor is further configured to, before assigning the sign, confirm that a magnitude-based threshold test is met.

14. The decoder claimed in claim 13, wherein the processor is configured to confirm by determining that the sum of the magnitudes of the motion vector difference components exceeds a threshold value.

15. A non-transitory processor-readable medium storing processor-executable instructions which, when executed, configures one or more processors to perform the method claimed in claim 1.

16. A method of decoding a bitstream of inter-coded video using sign bit hiding, wherein a prediction block in a reference frame is specified by a motion vector, the bitstream encoding a horizontal motion vector difference component and a vertical motion vector difference component, wherein the motion vector is determined, in the decoder, based on a predicted motion vector adjusted by the horizontal motion vector difference component and the vertical motion vector difference component, the method comprising:
- determining that a picture header in the bitstream contains a motion vector sign bit hiding flag indicative that motion vector sign bits within a corresponding picture are hidden;
- decoding a part of the bitstream to reconstruct a magnitude of one of the motion vector difference components;
- inferring a sign for said one of the motion vector difference components based on whether said magnitude is even or odd; and
- assigning the sign to said magnitude to reconstruct said one of the motion vector difference components.

17. The method claimed in claim 16, wherein assigning said sign comprises assigning said sign to the horizontal motion vector difference component unless the horizontal motion vector difference component is zero, in which case assigning comprises assigning said sign to the vertical motion vector difference component.

18. The method claimed in claim 16, wherein assigning said sign comprises assigning said sign to the vertical motion vector difference component unless the vertical motion vector difference component is zero, in which case assigning comprises assigning said sign to the horizontal motion vector difference component.

19. The method claimed in claim 16, wherein assigning includes determining which of the horizontal motion vector difference component and the vertical motion vector difference component has greater magnitude and assigning said sign to the motion vector difference component having the greater magnitude.

20. The method claimed in claim 16, further comprising, before assigning, confirming that a magnitude-based threshold test is met.

21. The method claimed in claim 20, wherein confirming comprises determining that the sum of the magnitudes of the motion vector difference components exceeds a threshold value.

22. A decoder for decoding a bitstream of inter-coded video using sign bit hiding, wherein a prediction block in a reference frame is specified by a motion vector, the bitstream encoding a horizontal motion vector difference component and a vertical motion vector difference component, wherein the motion vector is determined, in the decoder, based on a predicted motion vector adjusted by the horizontal motion vector difference component and the vertical motion vector difference component, the decoder comprising:
- a processor;
- a memory; and
- a decoding application stored in the memory and containing instructions that, when executed, cause the processor to:
  - decode a part of the bitstream to reconstruct a magnitude of one of the motion vector difference components,
  - infer a sign for said one of the motion vector difference components based on whether said magnitude is even or odd, and
  - assigning the sign to said magnitude to reconstruct said one of the motion vector difference components.

23. The decoder claimed in claim 22, wherein the processor is configured to assign said sign by assigning said sign to the horizontal motion vector difference component unless the horizontal motion vector difference component is zero, in which case the processor assigns said sign to the vertical motion vector difference component.

24. The decoder claimed in claim 22, wherein the processor is configured to assign said sign by assigning said sign to the vertical motion vector difference component unless the vertical motion vector difference component is zero, in which case the processor assigns said sign to the horizontal motion vector difference component.

25. The decoder claimed in claim 22, wherein the processor is configured to assign by determining which of the horizontal motion vector difference component and the vertical motion vector difference component has greater magnitude and assigning said sign to the motion vector difference component having the greater magnitude.

26. The decoder claimed in claim 22, wherein the processor is further configured to, before assigning the sign, confirm that a magnitude-based threshold test is met.

27. The decoder claimed in claim 26, wherein the processor is configured to confirm by determining that the sum of the magnitudes of the motion vector difference components exceeds a threshold value.

28. A non-transitory processor-readable medium storing processor-executable instructions which, when executed, configures one or more processors to perform the method claimed in claim 16.

* * * * *